US010068126B2

(12) United States Patent
Zahniser et al.

(10) Patent No.: US 10,068,126 B2
(45) Date of Patent: Sep. 4, 2018

(54) MICROSCOPE SLIDE COORDINATE SYSTEM REGISTRATION

(71) Applicant: Roche Diagnostics Hematology, Inc., Westborough, MA (US)

(72) Inventors: Michael Zahniser, Jamaica Plain, MA (US); Russell Zahniser, Boston, MA (US)

(73) Assignee: Roche Diagnostics Hematology, Inc., Westborough, MA (US)

( * ) Notice: Subject to any disclaimer, the term of this patent is extended or adjusted under 35 U.S.C. 154(b) by 0 days.

(21) Appl. No.: 15/045,556

(22) Filed: Feb. 17, 2016

(65) Prior Publication Data
US 2016/0162726 A1     Jun. 9, 2016

Related U.S. Application Data

(63) Continuation of application No. 14/804,641, filed on Jul. 21, 2015, now Pat. No. 9,280,699, which is a (Continued)

(51) Int. Cl.
G06K 9/00     (2006.01)
G06T 7/00     (2017.01)
(Continued)

(52) U.S. Cl.
CPC ..... *G06K 9/00147* (2013.01); *G06K 9/00134* (2013.01); *G06T 7/0014* (2013.01);
(Continued)

(58) Field of Classification Search
None
See application file for complete search history.

(56) References Cited

U.S. PATENT DOCUMENTS 4,285,907 A     8/1981 Hugemann et al.
4,395,493 A     7/1983 Zahniser et al.
(Continued)

FOREIGN PATENT DOCUMENTS

CN     1385701     12/2002
CN     1793919     6/2006
(Continued)

OTHER PUBLICATIONS

English Translation of the First Office Action issued in Chinese Application No. 2011800694055 dated Jan. 15, 2015, 17 pages.
(Continued)

*Primary Examiner* — Vikkram Bali
(74) *Attorney, Agent, or Firm* — Fish & Richardson P.C.

(57) ABSTRACT

Systems, methods and computer program products for mapping coordinates of various imaging stations are described. In some implementations, cells (e.g., red blood cells) in a biological specimen can be used for determining the mapping information between the imaging stations. The use of cells allows a target image (e.g., an image of a sub-region of cells in the biological specimen) taken by one imaging station to be pattern-matched to a reference image (e.g., an image showing a larger region of cells in the biological specimen that also includes the sub-region) taken by another imaging station. Once the target image is matched to the reference image, point by point correspondence (and therefore coordinates) between the target image and the reference image can be established for computing the coordinate transformation to map the imaging stations.

23 Claims, 8 Drawing Sheets

Related U.S. Application Data continuation of application No. 13/008,848, filed on Jan. 18, 2011, now Pat. No. 9,111,343.

(51) Int. Cl.
 *G06T 7/33* (2017.01)
 *G06T 7/11* (2017.01)

(52) U.S. Cl.
 CPC .............. *G06T 7/11* (2017.01); *G06T 7/337* (2017.01); *G06T 2207/10056* (2013.01); *G06T 2207/30024* (2013.01)

(56) References Cited

U.S. PATENT DOCUMENTS

| | | | |
|---|---|---|---|
| 5,419,279 A | 5/1995 | Carrico, Jr. et al. | |
| 5,444,245 A | 8/1995 | Kitamura | |
| 5,650,332 A | 7/1997 | Gao et al. | |
| 5,665,312 A | 9/1997 | Sperber et al. | |
| 5,804,145 A | 9/1998 | Gao et al. | |
| 5,882,933 A | 3/1999 | Li et al. | |
| 6,132,353 A | 10/2000 | Winkelman et al. | |
| 6,151,405 A | 11/2000 | Douglass et al. | |
| 6,228,652 B1 | 5/2001 | Rodriguez et al. | |
| 6,249,344 B1 | 6/2001 | Virag | |
| 6,268,611 B1 | 7/2001 | Pettersson | |
| 6,287,791 B1 | 9/2001 | Terstappen et al. | |
| 6,398,705 B1 | 6/2002 | Grumberg et al. | |
| 6,489,625 B1 | 12/2002 | Takahashi | |
| 6,711,283 B1 | 3/2004 | Soenksen | |
| 7,006,674 B1 | 2/2006 | Zahniser et al. | |
| 7,300,804 B2 | 11/2007 | Sellek-Prince | |
| 7,327,901 B2 | 2/2008 | Karlsson et al. | |
| 7,343,257 B2 | 3/2008 | Stock | |
| 7,561,329 B2 | 7/2009 | Zahniser et al. | |
| 7,689,038 B2 | 3/2010 | Zahniser | |
| 7,796,797 B2 | 9/2010 | Nakaya et al. | |
| 7,881,532 B2 | 2/2011 | Zahniser | |
| 7,940,998 B2 | 5/2011 | Doerrer | |
| 8,055,097 B2 * | 11/2011 | Inoue ................. | H04N 5/23212 348/208.16 |
| 8,965,076 B2 * | 2/2015 | Garcia ................. | G06T 7/0012 382/109 |
| 9,111,343 B2 | 8/2015 | Zahniser et al. | |
| 9,280,699 B2 | 3/2016 | Zahniser et al. | |
| 2002/0003895 A1 | 1/2002 | Some | |
| 2002/0085744 A1 | 7/2002 | Domanik et al. | |
| 2002/0182623 A1 | 12/2002 | Lefevre et al. | |
| 2003/0030783 A1 | 2/2003 | Roche et al. | |
| 2004/0131241 A1 | 7/2004 | Curry et al. | |
| 2004/0175832 A1 | 9/2004 | Hui et al. | |
| 2005/0003458 A1 | 1/2005 | Moore et al. | |
| 2005/0003464 A1 | 1/2005 | Tibbe | |
| 2006/0051241 A1 | 3/2006 | Higuchi et al. | |
| 2006/0223172 A1 | 10/2006 | Bedingham et al. | |
| 2007/0076983 A1 | 4/2007 | Doerrer | |
| 2007/0128073 A1 | 6/2007 | Tappen | |
| 2008/0279441 A1 | 11/2008 | Matsuo et al. | |
| 2008/0318305 A1 | 12/2008 | Angros | |
| 2009/0032583 A1 | 2/2009 | Lapstun et al. | |
| 2009/0069639 A1 | 3/2009 | Linssen et al. | |
| 2009/0155841 A1 | 6/2009 | Yamasaki | |
| 2009/0161962 A1 | 6/2009 | Gallagher et al. | |
| 2009/0213214 A1 | 8/2009 | Yamada | |
| 2009/0269799 A1 | 10/2009 | Winkelman et al. | |
| 2009/0275076 A1 | 11/2009 | Knesel et al. | |
| 2010/0111399 A1 | 5/2010 | Ramirez et al. | |
| 2010/0239172 A1 | 9/2010 | Akiyama | |
| 2010/0284602 A1 | 11/2010 | Winkelman et al. | |
| 2011/0070606 A1 | 3/2011 | Winkelman et al. | |
| 2012/0183198 A1 | 7/2012 | Zahniser et al. | |
| 2015/0324628 A1 | 11/2015 | Zahniser et al. | |

FOREIGN PATENT DOCUMENTS

| | | |
|---|---|---|
| CN | 1836185 | 9/2006 |
| CN | 1945326 | 4/2007 |
| DE | 3503475 | 8/1987 |
| EP | 0 861 431 | 3/2003 |
| EP | 0 810 428 | 4/2004 |
| EP | 1 812 799 | 8/2007 |
| EP | 1 957 205 | 8/2008 |
| EP | 2 072 993 | 6/2009 |
| EP | 2 202 523 | 6/2010 |
| JP | 60-162955 | 8/1985 |
| JP | 07-020650 | 1/1995 |
| JP | 07-083817 | 3/1995 |
| JP | 2008-507806 | 8/1996 |
| JP | 2009-033411 | 2/1997 |
| JP | 11-326208 | 11/1999 |
| JP | 2000-00573 | 1/2000 |
| JP | 2000-284186 | 10/2000 |
| JP | 2001-174456 | 6/2001 |
| JP | 2001-283190 | 10/2001 |
| JP | 2001-518186 | 10/2001 |
| JP | 2001-283190 | 12/2001 |
| JP | 2002-516982 | 6/2002 |
| JP | 2005-181312 | 7/2005 |
| JP | 2009-175334 | 8/2009 |
| WO | WO 94/20856 | 9/1994 |
| WO | WO 2001/04276 | 1/2001 |
| WO | WO 2005/022125 | 3/2005 |
| WO | WO 2006/024716 | 3/2006 |
| WO | WO 2007/105198 | 9/2007 |
| WO | WO 2008/046292 | 4/2008 |
| WO | WO 2010/053869 | 5/2010 |
| WO | WO 2010/143420 | 12/2010 |

OTHER PUBLICATIONS

English Translation of the Final Notice of Grounds of Rejection issued in Japanese Application No. 2013-550455 dated Jan. 20, 2015, 7 pages.

Tominaga, Daisuke, Partial Translation of "Automated Image Processing System for Cell Array Observations", Information Processing Society of Japan SIG Technical Report, vol. 2007:57-62 (Mar. 2007).

Office action dated Jul. 15, 2014 in corresponding Japanese application No. 2013-550455, 10 pgs.

Examination report dated Mar. 4, 2014 in corresponding Australian application No. 2011355697, 3 pgs.

International Preliminary Report on Patentability dated Aug. 1, 2013 in international application No. PCT/US2011/021546, 7 pgs.

Aller, R., et al., "High Volume Hematology Analyzers: Getting Better All the Time", CAP Today, pp. 27-34 (Dec. 2000) CMI0112.

Aus et al., "Bone Marrow Cell Scene Segmentation by Computer-Aided Color Cytophotometry," The Journal of Histochemisty and Cytochemistry, vol. 25, No. 7, pp. 662-667 (1977).

Authorized Officer Marion Salaün, International Search Report and Written Opinion for PCT Application No. PCT/US2011/021546, dated Jan. 18, 2011, 14 pages.

Authorized Officer Lingfei Bai, International Preliminary Report on Patentability for PCT Application No. PCT/US10/32612, dated Nov. 1, 2011, 2 pages.

Authorized Officer Lee W. Young, International Search Report and Written Opinion for PCT Application No. PCT/ US2009/041858, dated Jun. 28 2010, 13 pages.

Authorized Officer Luis-Miguel Paredes Samchez, Written Opinion for PCT Application No. PCT/US10/32612, dated Jun. 28, 2010, 11 pages.

Bacus, J., "Erythrocyte Morphology and Centrifugal 'Spinner' Blood Film Preparations", The Journal of Histochemistry and Cytochemistry, vol. 22:506-516 (1974) CMI0053.

Brenner et al, "Au Automated Microscope for Cytologic Research a Preliminary Evaluation," The Journal of Histochemisty and Cytochemistry, vol. 24, No. 1, pp. 100-111 (1976).

(56) References Cited

OTHER PUBLICATIONS

Dunlop et al., "Kinetics of Adhesive Interaction In-Vitro of Human Erythrocytes in Plasma," Microvascual Research, 28(1):62-74 (1984).
Green, "A Practical Application of Computer Pattern Recognition Research The Abbott ADC-500 Differential Classifier," The Journal of Histochemistry and Cytochemistry, vol. 27, No. 1, pp. 160-173 (1979).
Lehmann, C., et al., "Image Technology and its Role in Hematology", Advance/Laboratory, pp. 84-88 (May 2000) CMI0159.
Meyer, E., "Vickers Continuous Film", Cytology Automation: Proceedings of Second Tenovus Symposium, Cardiff 24th—25th, pp. 147-153 (Oct. 1968) CMI0043.
Novis, D., et al., "Laboratory Productivity and the Rate of Manual Peripheral Blood Smear Review: A College of American Pathologists Q-Probes Study of 95141 Complete Blood Count Determinations Performed in 263 Institutions", Archives of Pathology and Laboratory Medicine, vol. 130:596-601 (2006) CMI00255.
Rogers, C., "Blood Sample Preparation for Automated Differential Systems", American Journal of Medical Technology, vol. 39: 435-442 (1973) CMI0361.
Seiter, C., et al., "Contact Angles: New Methods and Measurements", *American Laboratory*, p. 26 (Feb. 2002) CMI0110.
Walters, J., et al., "Performance Evaluation of the Sysmex XE-2100 Hematology Analyzer", *Laboratory Hematology*, vol. 6:83-92 (2000) CMI0264.
Walker, T., "Comparative Evaluation of the Iris iQ200 Body Fluid Module with Manual Hemacytometer Count", *American Journal of Clinical Pathology*, vol. 131:333-338 (2009) CMI0274.
Ward, P., "The CBC at the Turn of the Millenium: An Overview", Clinical Chemistry, vol. 46:1215-1220 (2000) CMI00235.
Holberg et al., Iris Diagnostics Case Study: New Automated Urinalysis Workcell Review, pp. 1-6 (2009).
Promotional materials for DRD™ Diluter Corporation's Little Squirt™, NanoBlast-96™, and Differential NanoPipettor™/Diluter, 6 pages, downloaded on (Feb. 2005).

* cited by examiner

MICROSCOPE SLIDE COORDINATE SYSTEM REGISTRATION

CROSS-REFERENCE TO RELATED APPLICATIONS

This application is a continuation of and claims priority to U.S. application Ser. No. 14/804,641, filed on Jul. 21, 2015, which is a continuation of and claims priority to U.S. application Ser. No. 13/008,848, filed on Jan. 18, 2011, now U.S. Pat. No. 9,111,343. The entire contents of each of the above applications are incorporated herein by reference.

TECHNICAL FIELD

The subject matter of this application is generally related to image processing.

BACKGROUND

An automated imaging system including microscope optics, a camera, a motorized stage, and computer control system can automatically acquire images of cells from a biological specimen deposited on a microscope slide. The system may then process these images to identify cells of interest. These cells may need to be revisited later; for example, to acquire higher-magnification images of such cells or to present certain cells of interest for manual review. This revisiting often occurs on a separate imaging station. For the stage locations corresponding to cells of interest found at the first imaging station, this second imaging station must relocate those exact cells for further review.

If the coordinate systems of the two imaging stations were identical, the second station could simply move its stage to the stage position reported for a cell on the first imaging station, and that cell would be centered in the field of view at the second imaging station. However, due to differences from stage to stage or inaccuracies in how the slide is loaded or secured at a particular imaging station, the same stage coordinates on two different imaging stations often correspond to different regions of the specimen presented in the field of view for the imaging station optics. An error may occur when the slide, upon being placed on a movable stage of an imaging station, is skewed slightly or not banked properly against the slide holder. Further, an error may occur when the nominal zero position of the stage gradually changes from day to day due to inaccuracies in the stage home switches. Small errors of this sort have a dramatic effect because a higher magnification field of view on a second imaging station may be less than a tenth of a millimeter across the specimen. An error of even half that amount is sufficient to displace the cell of interest from the image. Therefore, it is advantageous, for each slide, to measure and correct for any error in slide positioning.

Traditionally, microscope slides used in imaging systems or for manual review have one or more "fiducial marks" printed on them which establish a standard coordinate system for the slide that is independent of the stage. At each of the imaging stations, the imaging system locates these marks on the slide and the differences in their coordinates are used to determine a transformation that can be applied to convert coordinates from the first imaging station into coordinates for the second imaging station. This method is effective, but requires special marks printed on the slides, which potentially increases slide manufacturing costs. In addition, the method is time consuming, because it may be necessary to search several location before the fiducial mark is located in an image. This is especially difficult at high magnification because the field of view is smaller as compared to an imaging station using a lower magnification. There is a need, therefore, for methods and systems that translate stage coordinates for an object of interest or field of view on one imaging station to coordinates for other imaging stations, without the use of pre-printed fiducial marks on microscope slides.

SUMMARY

Systems, methods and computer program products are described that use cells of a biological sample deposited on a substrate to determine a coordinate transformation between stage coordinates of two or more imaging stations. A slide is loaded onto a first imaging station. The first imaging station acquires images of cells and selects certain images to use as reference images. A computer stores the reference images along with the stage coordinates at which the first imaging station acquired the reference images. The slide is then loaded onto a second imaging station that can acquire images at a higher magnification than the first imaging station. The second imaging station acquires a second image at the stage coordinates where the first imaging station acquired the reference image.

Thus, if the stages of the two imaging stations were perfectly matched, the second image would be centered around the same cells that were centered in the reference image. More typically, there is a slight mismatch in the coordinate systems of the two stages, and the second image is centered around cells that are found somewhere off-center in the reference image. Because the magnification of the reference image is known, the stage coordinates of those cells on the first station can be determined. Thus, the stage coordinates of those cells on the second system are matched to their stage coordinates on the first system. This process is repeated for each of the reference images. The pairs of corresponding coordinates determined in this way may be used to calculate a mathematical transformation that will convert any locations on the first station—the locations of cells of interest, for example—into the correct locations on the second station.

Methods are also presented for selecting the reference images from a larger set of possible candidates in order to minimize certain error sources. This includes identifying reference images that do not have large patches devoid of cellular material, which may result in a blank second image if taken at a higher magnification as compared to the first imaging station. In addition, the disclosed methods select reference images from regions of the slide that are sufficiently spaced apart and not collinear, in order for the mathematical transformation to be as accurate as possible. In addition, methods are disclosed for efficiently matching the second image to the reference image.

In some implementations, a method for relocating an object of interest at a second imaging station based on coordinates for the object of interest at a first imaging station is provided. The method can include acquiring a first pair of images including a reference image of a specimen on the first imaging station and a second image of the specimen on the second imaging station; identifying a cell group that appears in both the reference image and second image; determining stage coordinates of the cell group on the first imaging station from stage coordinates at which the reference image was acquired; determining stage coordinates of the cell group on the second imaging station from stage coordinates at which the second image was acquired; and calculating an affine transformation that converts the stage coordinates of the first imaging station to the stage coordinates of the second imaging station.

In some implementations, a system also can be provided that includes a first imaging station to acquire a reference image of a specimen on the first imaging station; and a second imaging station to: acquire a second image of the specimen on the second imaging station; identify a cell group that appears in both the reference image and second image; determine stage coordinates of the cell group on the first imaging station from stage coordinates at which the reference image was acquired; determine stage coordinates of the cell group on the second imaging station from stage coordinates at which the second image was acquired; and calculate an affine transformation that converts the stage coordinates of the first imaging station to the stage coordinates of the second imaging station.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

System Overview

Figure 1A:
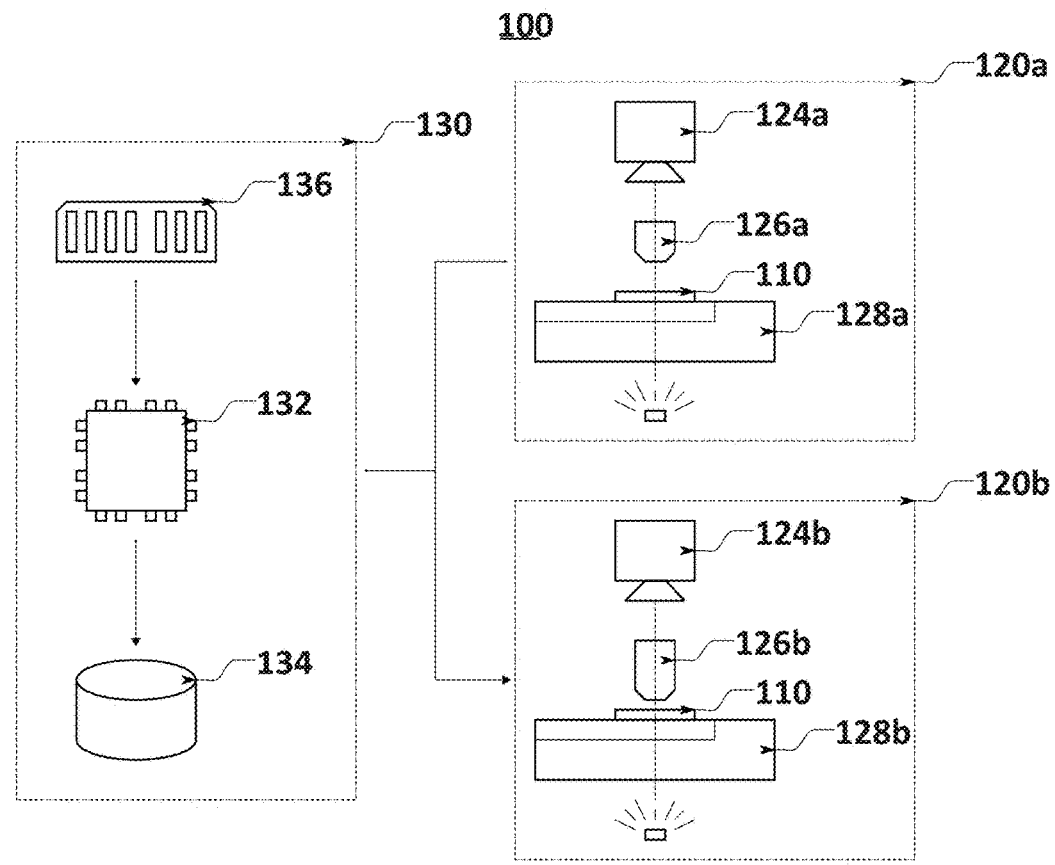
FIG. 1A shows an example of a biological specimen imaging system.

FIG. 1A shows an example of a biological specimen imaging system 100 controlled by a computer 130. The computer 130 includes a central processing unit (CPU) 132, a hard drive 134, a memory 136, and other hardware components conventionally known (e.g., communication interfaces). The computer 130 is capable of communicating with a low magnification imaging station 120a and a high magnification imaging station 120b via known communications protocols using standard hardware connections between the computer and the imaging stations. This communications capability allows computer 130 to command the stages 128a and 128b to move to different (x, y) positions in the horizontal plane, to move objectives lenses 126a and 126b up and down the vertical axis relative to the surface of a microscope slide 110, and to receive images captured from the cameras 124a and 124b.

System 100 is capable of capturing and processing images of a biological specimen 112 deposited on a microscope slide 110. For example, the biological specimen 112 may comprise a thin monolayer of blood cells on the surface of slide 110. The image capture steps begin with a first imaging station 120a scanning the entire specimen deposited on slide 110 under a low power objective lens 126a. Computer 130 selects a plurality of reference images obtained from the low magnification scan of the specimen. In addition, computer 130 is capable of processing the low magnification images to identify objects of interest requiring imaging under a higher power objective lens 126b as included in the second imaging station 120b.

After completing the scanning, image capture, and image processing steps performed in connection with the first imaging station 120a, an automated transport system (not shown in FIG. 1) moves slide 110 to the high magnification imaging station 120b. For each of the reference images obtained at the first imaging station 120a, the high magnification imaging station 120b moves the slide 110 via second stage 128b to the stage coordinates where the first imaging station captured the reference image, and acquires a second image. As further described below, and using various features of the specimen deposited on slide 110, computer 130 matches the second image to the reference image, and converts the pixel offset between the reference and second images to an offset value (e.g., in microns) between the coordinate systems of the first imaging station 120a (first stage 128a) and second imaging station 120b (second stage 128b).

Computer 130 is capable of converting the offset value to a distance in microns because the magnification values of the reference and second images are known. By way of example, system 100 acquires a reference image of specimen 112 at stage coordinates (54000 µm, 18000 µm) on a first imaging station. When the system acquires a second image at those same coordinates at the second imaging station, computer 130 determines that the second image matches a location 200 pixels below and 300 pixels to the right of the center of the reference image location. If the reference image has a magnification of 0.88 µm per pixel, this offset can be translated into microns (e.g., 264 µm, 176 µm). This means that to image the cells that were at coordinates (54000 µm, 18000 µm) on the first station, the second station must move its stage to the coordinates at (54264 µm, 18176 µm).

System 100 completes this process for any remaining reference images selected by the computer, and, as further detailed below, computer 130 calculates an affine transformation that maps the first coordinate system (i.e., of the first imaging station 120a and first stage 128a) to the second coordinate system (e.g., of the second imaging station 120b and second stage 128b). Thereafter, when required to capture an image of a cell whose coordinates were noted on the first imaging station, system 100 applies this transformation to those coordinates in order to obtain the equivalent stage coordinates on the second imaging station.

Slide Scanning Overview

In certain applications, biological specimen 112 can comprise a blood sample deposited on the slide 110 as a monolayer of cells and prepared by an embodiment of the system disclosed, for example, in co-pending U.S. application Ser. No. 12/430,885, entitled "Method of Determining a Complete Blood Count and a White Blood Cell Differential", the disclosure of which is incorporated herein by reference in its entirety. After one or more fixing, staining, rinsing, and/or drying steps, an automated transport system or laboratory technologist loads slide 110 onto the first stage 128a of the low magnification imaging station 120a. Computer 130 then commands first stage 128a to move slide 110 such that a desired location of the specimen is positioned directly underneath the low power objective lens 126a.

The "field of view" of the camera 124a through objective lens 126a includes a region of the specimen on slide 110 that camera 124a captured in one or more images. In an embodiment of system 100, the low power objective lens 126a includes a 10× objective, and additional optics (not shown) between the low power objective lens 126a and the camera 124a capable of shrinking the image to 50% of its original size. Camera 124a includes a CCD array of 1624 by 1224 pixels, where each pixel in the array is 4.4 µm by 4.4 µm. Thus, the field of view dimensions for the first imaging station 120a can be calculated as follows [1]:

$$\text{width} = \left(1624 \text{ pixels} \cdot 4.4 \frac{\mu m}{\text{pixel}}\right)/(10 \cdot 0.5) = 1429 \, \mu m \quad [1]$$

$$\text{height} = \left(1224 \text{ pixels} \cdot 4.4 \frac{\mu m}{\text{pixel}}\right)/(10 \cdot 0.5) = 1077 \, \mu m$$

A standard microscope slide has dimensions of approximately 1 inch by 3 inches, or 25400 µm by 76200 µm. Imaging system 100 must, therefore, acquire several images to cover the portion of the slide 110 containing biological specimen 112. Where a particular application requires imaging the entire specimen, the scanning process can begin with the first stage 128a positioning one corner of the biological specimen 112 under the low power objective lens 126a. The first stage 128a can then be moved in the "X" direction in steps equal to the width of the field of view of the camera 124a (e.g., 1429 µm), and one or more images may be acquired at each step. For example, at each location, camera 124a can capture a series of images at different focal heights and/or with different colors of illumination. When the entire width of the biological specimen 112 has been scanned, the first stage 128a can move in the "Y" direction by an amount equal to the height of the field of view for camera 124a (e.g., 1077 µm). A new series of images also can be acquired by stepping the first stage 128a in the opposite "X" direction by the same step amount until the camera 124a reaches the other edge of the biological specimen 112. System 100 repeats this process until camera 124a has imaged the entire the biological specimen 112 on slide 110.

In the scanning process described above, system 100 can acquire several hundred or more images of biological specimen 112. These images are used for making certain measurements on the specimen, to choose regions of the specimen or certain cells of interest to revisit under a higher magnification, and to identify one or more reference images for mapping stage coordinates from the first imaging station 120a to the second imaging station 120b. For example, system 100 can use the images obtained at first imaging station 120a to count red and white blood cells in the specimen. In addition, system 100 may select a portion of the white blood cell population to revisit under high magnification for further classification.

Once the slide 110 has been scanned at the low magnification imaging station 120a, the slide 110 can be moved to the second imaging station 120b. The camera 124b, in conjunction with a higher magnification objective 126b as compared to objective 126a, will have a smaller field of view than the camera 124a at the first imaging station. For example, with a 50× objective lens as the magnification lens 126b, and camera 124b including a 640-by-480 pixel CCD, the pixel size at the second imaging station is 7.4 µm. Thus, the dimensions of the field of view at the second imaging station 120b may be calculated as [2]:

$$\text{width} = \left(640 \text{ pixels} \cdot 7.4 \frac{\mu m}{\text{pixel}}\right)/50 = 95 \, \mu m \quad [2]$$

$$\text{height} = \left(480 \text{ pixels} \cdot 7.4 \frac{\mu m}{\text{pixel}}\right)/50 = 71 \, \mu m$$

As discussed above, one or more locations or cells of interest on specimen 112 imaged during the low magnification scan can be revisited on the second imaging station 120b. To accelerate the image acquisition process at the second imaging station 120b, computer 130 may command the stage 128b to move slide 110 and present only those specific locations on specimen 112 for image capture instead of performing a full scan of the specimen at the second imaging station 120b. Thus, the second imaging station 120b must position slide 110 relative to the field of view of camera 124b such that camera 124b acquires images of the desired locations or cells of interest identified during the scan performed at the first imaging station. While the coordinates of such locations or cells are known in the coordinate system of the first stage 128a of the first imaging station 120a, the system must map these coordinates to coordinates of the second stage 128b at the second imaging station 120b in order to precisely reimage those exact cells. Thus, system 100 must determine the difference between the two coordinate systems (e.g., the coordinate system of the first imaging system 120a and that of the second imaging system 120b), and account for such difference when imaging selected locations at the second imaging station. As a variety of factors influence this difference, the difference typically cannot be measured once during manufacturing and stored on the computer 130 of the system 100. Instead, system 100 measures the difference anew for every slide 110 imaged on the first and second imaging stations 120 and 120b. This measurement process typically begins by selecting reference images for the specimen 112.

Selection of Reference Images

Computer 130 selects one or more images acquired during the low magnification scan of specimen 112 to use as a reference image 210 for mapping stage coordinates between the first imaging station 120a and the second imaging station 120b. Selecting reference images with an adequate cell count ensures that the reference image 210 contains sufficient information to perform an unambiguous match to a second image 220 acquired at a second imaging station 120b with an increased magnification (e.g., at least three or four cells). Further, the portion of the specimen depicted in the reference image 210 is larger than most, if not all, slide positioning errors or coordinate offsets between the first and second imaging stations 120a and 120b. For example, if the low magnification field of view is 1429 µm by 1077 µm, the slide position at the second imaging station would need to be greater than half a millimeter for the second image 220 taken at the reference image coordinates to not contain any cells found within the reference image 210. As some positioning error is likely, the second image 220 may, in practice, match any part of the reference image 210.

Figure 4A:
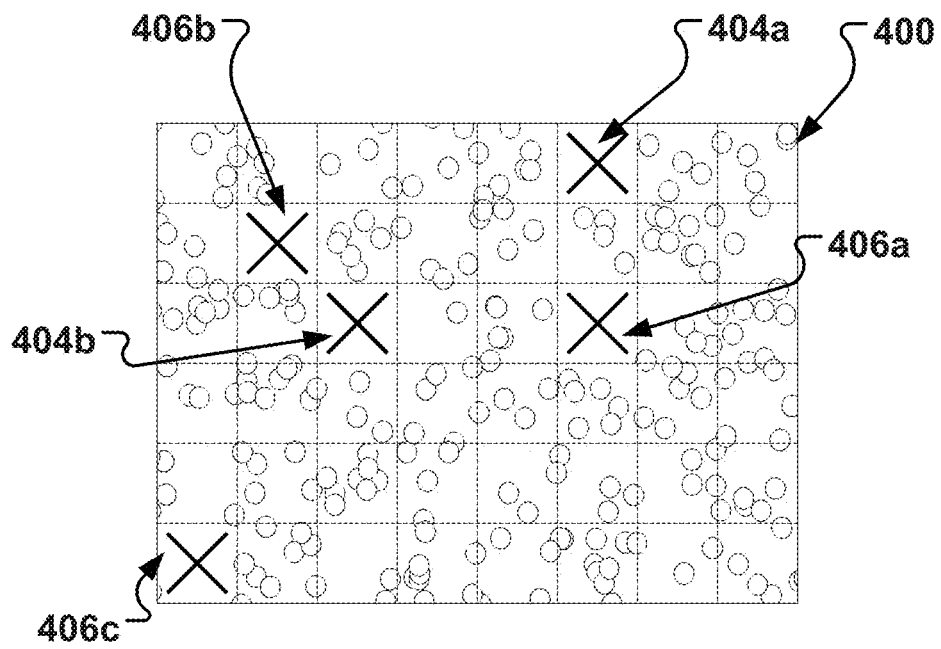
FIG. 4A shows an example of an image from which a second image can be determined.

Computer 130 can assign coverage scores to images taken at the first imaging station to evaluate whether such images are acceptable to use as reference images. FIG. 4A shows a reference image candidate 400 captured during the low magnification scan of specimen 112. The image 400 may be split into a series of smaller regions by superimposing a grid on the image as shown in FIG. 4A. In this example, the grid size is 8-by-6 squares, although other grid sizes or other methods for assessing cellular coverage are possible. FIG. 4A shows that the reference image candidate contains two grid squares, 404a and 404b, containing no cells, and three additional grid squares, 406a, 406b and 406c, containing only small portions of cells. In this example, computer 130 assigns the image 400 a coverage score of −5; that is, five of the grid squares are unacceptable.

Figure 4B:
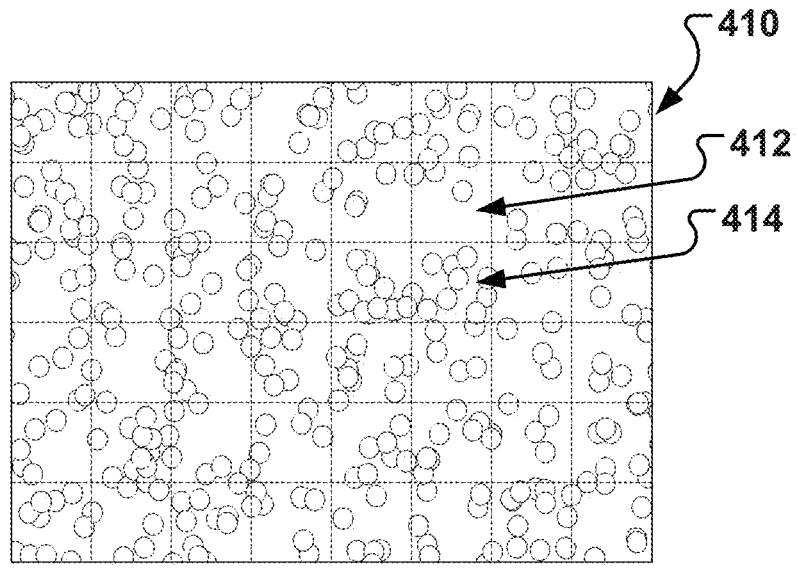
FIG. 4B shows an example of an image with a coverage score higher than that shown in FIG. 4A.

FIG. 4B depicts a reference image candidate 410 with a higher coverage score than the image shown in FIG. 4A. Each grid square in the image 410 contains at least a few cells and therefore, system 100 assigns image 410 a coverage score of zero (i.e., image 410 does not contain any blank grid squares). As image 410 has a higher coverage score value than image 400, system 100 will prefer image 410 over image 400 when selecting reference images.

Those skilled in the art will appreciate that other metrics or other scoring conventions may be used to assess the cellular coverage of reference image candidates. For example, system 100 can assign a higher score to a region of an image that is 50% full as compared to a region that is 100% full of cells. In this latter region, the cells may be packed so tightly that the system may not be able to distinguish among individual cells, which may be as problematic for the registration algorithm as a completely empty region within the specimen deposited on the slide.

Aside from selecting reference images with acceptable coverage, computer 130 can also ensure that selected reference images are sufficiently spaced apart from one another. In addition, when selecting three or more reference images, system 100 can select reference images from non-collinear regions of specimen 112. If system 100 selected reference images from points on specimen 112 too close together, any small inaccuracy in measuring the reference image locations would be magnified when extrapolating the coordinate transform measurement to specimen regions outside of the vicinity of the reference image locations.

Embodiments of the present invention advantageously minimize the number of reference image candidates evaluated for registration and, in turn, reduce the burden on system 100 to save all of the images captured during a low magnification scan of specimen 112 for reference image candidates. Computer 130 can pre-select certain scan regions of specimen 112 to identify reference images. As further described below, computer 130 can define three different sections of specimen 112 such that any image location with a particular section is a sufficient distance away from reference image locations in the other two regions of specimen 112.

Figure 5A:
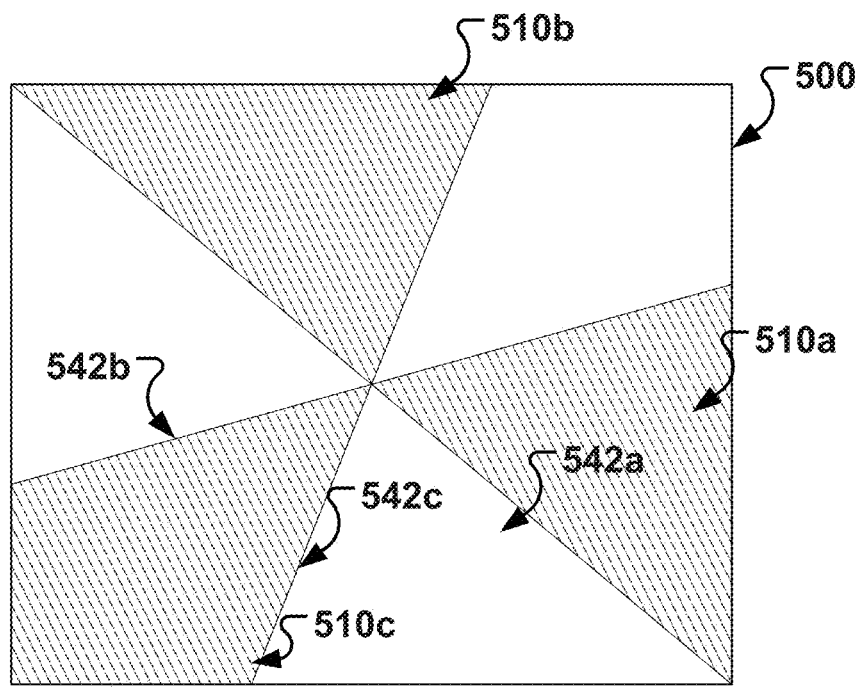
FIG. 5A shows an example of a scan area with three sections having been defined from which one reference image can be chosen from each region.

FIG. 5A shows an example of a scan area 500 of specimen 112 with three sections defined for identifying reference images. Scan area 500 can represent several hundred low magnification images and, for example, can cover a significant portion of or the entire biological specimen 112 deposited on slide 110. Three lines, i.e., 542a, 542b, and 542c, split the scan area 500 into six regions, and the three lines 542a-542c trisect the edges of the scan area 500. As shown in FIG. 5A, the six regions defined will have equal area regardless of the dimensions of the scan area 500. For example, the top region 510b can be a triangle with a base length ⅔ the width of the scan area 500 and a height ½ the height of the scan area 500, with an area $$\frac{1}{2}\left(\frac{2}{3}\cdot\text{width}\right)\cdot\left(\frac{1}{2}\cdot\text{height}\right)=\frac{1}{6}\cdot\text{width}\cdot\text{height},$$

or one sixth the area of the scan area 500. By selecting the alternating regions 510a, 510b, and 510c of equal area, three regions of the scan area 500 each having the same area can be obtained. Computer 130 can constrain the system 100 when selecting the reference image such that the system selects each of the three reference images from the different shaded regions 510a, 510b, and 510c.

Figure 5B:
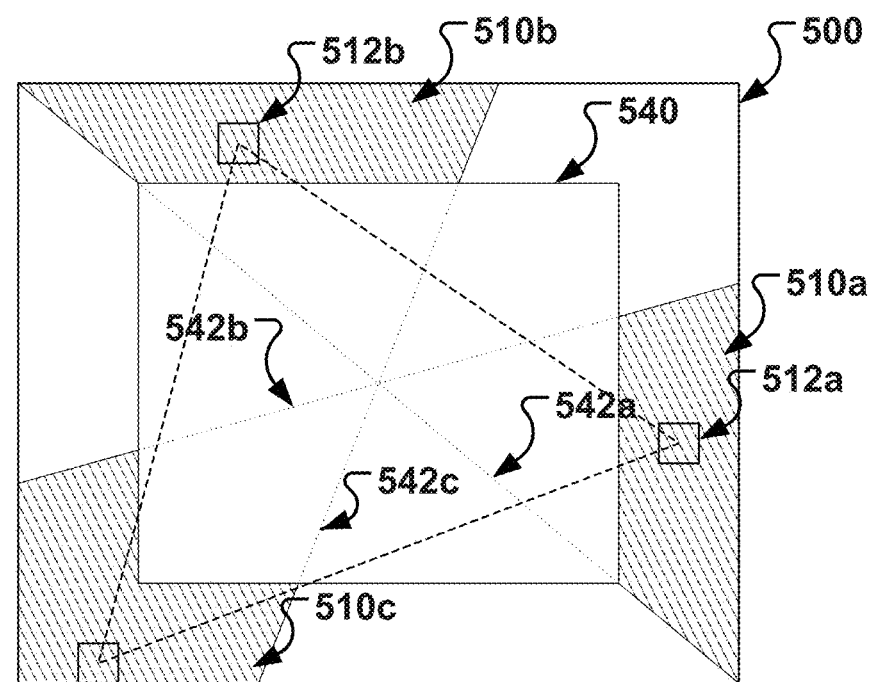
FIG. 5B shows a region masked out in a center of a scan area.

The foregoing process, however, will not eliminate the possibility that three reference images may be chosen very close together, as the system 100 may select reference images near the center of the scan area 500, closest to the point where the three regions 510a, 510b, and 510c converge. Accordingly and as shown in FIG. 5B, system 100 can mask a region in the center of the scan area 500 to restrict the three regions 510a, 510b, and 510c to regions along the edges of the scan area 500. If the masked out region 540 has the same center as the scan area 500 and the same aspect ratio, the three regions 510 outside the mask areas are still equal in area. This masking technique is one method that system 100 may employ to ensure that reference images are sufficiently spaced apart on the scan area 500 of specimen 112.

During the low magnification scan described above, system 100 may track the images with the highest coverage score in each of the three regions 510a-510c. As shown in FIG. 5B, the squares 512a, 512b, and 512c represent the field of view of the camera 124a with respect to the entire scan area 500. When a new image is acquired from within one of the three regions 510a-510c during the low-mag scan of specimen 112, computer 130 calculates the coverage score for the image. If the coverage score is better than a current best image in that region, system 100 replaces the image with the new image. In this manner, system 100 need only save a copy of the best image from each region for reference image purposes, instead of saving all images acquired during the low magnification scan. The division of scan area 500 as shown in FIG. 5A and FIG. 5B is illustrative only, and does not preclude the use of other methods for segregating the scan area 500 into three regions or for selecting the reference images.

When the slide 110 has been completely scanned on the low magnification imaging station 120a, the selected images and their respective coordinates can be preserved in the memory 136 or on the hard drive 134 for use when imaging slide 110 at the high magnification imaging station 120b.

Constellation Registration

At the second imaging station 120b, computer 130 commands the imaging hardware to acquire images at the stage coordinates corresponding to the reference image locations identified during the low magnification scan. Computer 130 then performs a matching process to register the high magnification image to a portion of the reference image 210 of specimen 112 deposited on slide 110. After matching the images, system 100 is capable of calculating the difference between the two coordinate systems of the first imaging station 120a and the second imaging station 120b, and accounting for such difference when imaging selected locations on slide 110 identified during the low magnification scan at a higher magnification of the second imaging station 120b.

When registering high magnification images to reference images, embodiments of the present invention can advantageously rely on the circular shape and roughly equivalent size of imaged cells. Because cells are similar in appearance, the pattern of center points of cells is sufficient to characterize a group of cells. This is similar to how a familiar constellation is recognized by the arrangement of its constituent stars, rather than by features such as brightness and color that vary little between stars. Those skilled in the art will recognize that there are many known algorithms for matching patterns of points. Many of these compensate well for rotation and perturbation of those points. However, in the present case of cell registration, the image being registered is unlikely to be significantly rotated or distorted, and a simpler algorithm may be used, as shown in FIG. 3.

Figure 3A:
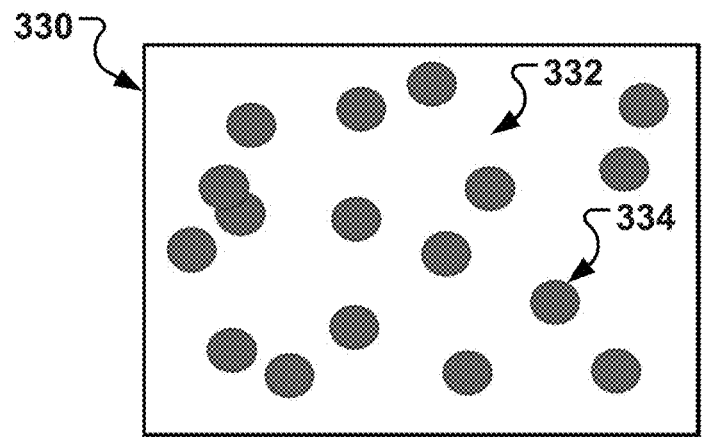
FIG. 3A shows an example of an image taken under low magnification.
Figure 3B:
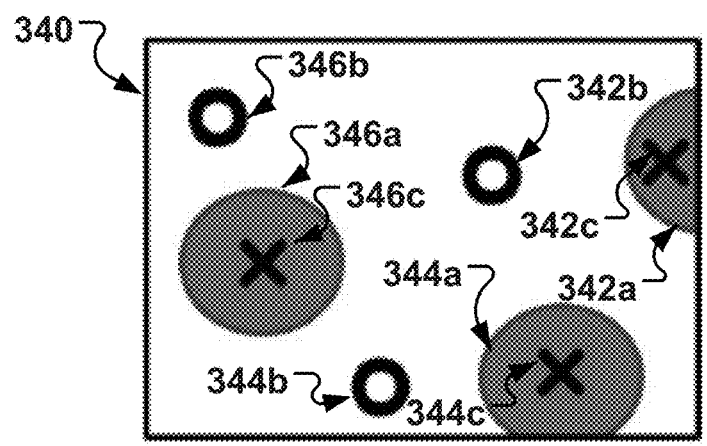
FIG. 3B shows an example of an image taken under high magnification.
Figure 3C:
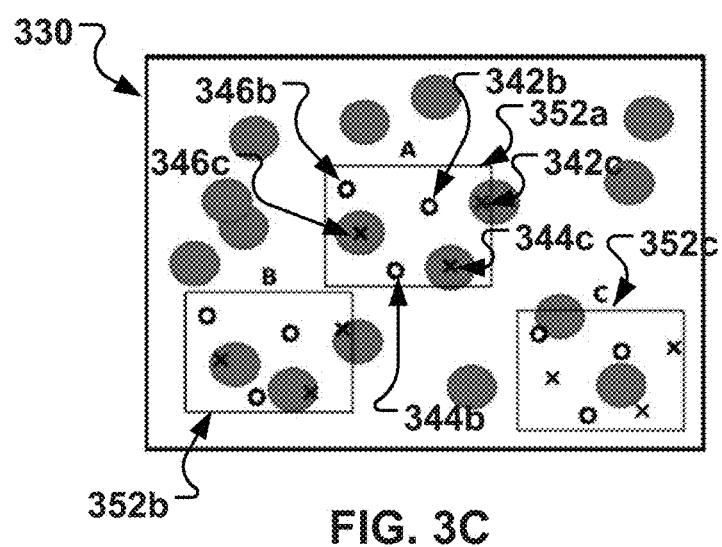
FIG. 3C shows an image taken under low magnification overlaid with an image taken under high magnification at various regions.

System 100 processes high magnification image 340 to identify center points of cells (e.g., 342c, 344c, 346c, marked with X's in FIG. 3B) and also points deep in background regions (342b, 344b, 346b, marked with O's in FIG. 3B). This pattern of points is then overlaid at various locations in the reference image 330, as shown in FIG. 3C. At a location that matches well, such as 352a, the cell center points of the pattern fall well within cells in the reference image, and the background points in the pattern fall well outside cells in the background region of the reference image. A less ideal location such as 352b still has the points of the pattern correctly located in cells or background regions, although much closer to the edges of cells and background regions as shown in FIG. 3C. A poor match such as 352c has few of the points properly located in the cellular and background regions. By performing a match to this pattern of points at each possible location in the reference image 330, the system can identify the best-matching location or determine that no location is a good match and thus the target image 340 contains cells not found in the reference image 330.

Figure 3D:
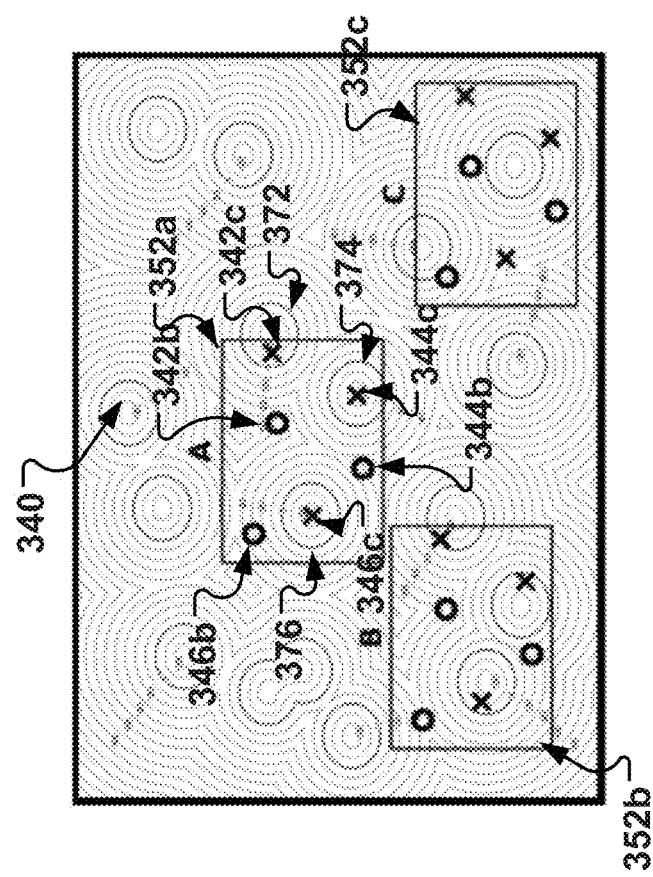
FIG. 3D shows three regions on a contour map masked by an image taken under high magnification.

When evaluating how well the pattern of points from target image 340 matches a region of reference image 330, the system can calculate a score based on how close those points are to the edge of cells or background regions. From the reference image 330, computer 130 constructs a scalar field called a distance transform in which points on cell edges (e.g., points 342a, 344a, 346a in FIG. 3B or X matching indicators of image frame 352b in FIG. 3C) have a value of zero, points within cells have a value corresponding to their distance from the edge, and points outside cells have a value that is the negative of their distance from the edge. Thus, cell center points (e.g., 342c, 344c, and 346c of image frame 352a shown in FIG. 3C) are positive local maxima, and deep background points (e.g., 342b, 344b, and 346b of image frame 352a shown in FIG. 3C) are negative local minima. When the point pattern from target image 340 is overlaid at various locations in a reference image, a distance transform scalar field, as shown in FIG. 3D, for a good match will have each cell center pattern point (X) at a location with a large positive value, and each deep background pattern point (O) at a location with a large negative value. A matching score for each location can therefore be computed by simply summing the field values at cell center pattern points and subtracting from that the field values at deep background pattern points. Scores for the locations shown in FIG. 3D are given in Table 1 below.

TABLE 1

| Image Frame | $X_1$ | $X_2$ | $X_3$ | $O_1$ | $O_2$ | $O_3$ | Total Score |
|---|---|---|---|---|---|---|---|
| 352A | 14 | 27 | 28 | −56 | −40 | −31 | 196 |
| 352B | 4 | 9 | 11 | −46 | −18 | −42 | 130 |
| 352C | −27 | −15 | −57 | −15 | −12 | −8 | −94 |

In practice, the target image 340 will contain several cells, for example, between ten and forty cells. Therefore, the matching pattern can contain as many as forty cell center points and as many as forty deep background points. For most locations tested, it is not necessary to sum all of these locations. If just a few of the most prominent points of each type are summed first, the score for most locations will be found to be low enough that it is not necessary to sum the remaining distance transform values. If the pattern points are identified as local maxima and minima of the distance transform of the target image 340, then the most prominent points are the most negative minima and the most positive maxima In so doing, the pattern matching process need not proceed through every set of points in the scanned image, including those that provide little or no meaning value to the matching score, to thereby speed up the pattern matching process without affecting the reliability of the matching score.

Coordinate Transformation

Once the system locates cells in an image from the second imaging station and matches such cells to a location in a reference image acquired at the first imaging station, computer 130 can calculate the coordinates of those cells on the second imaging station. The computer makes this calculation by using the known size, in microns, of a pixel in the reference image. Repeating this process for all the reference image locations, the computer obtains several pairs of coordinates that locate the same cells on the two different imaging stations. The computer can then calculate an affine transformation mapping coordinates of the first imaging station to coordinates of the second imaging station. In one embodiment, the first imaging station 120a and the second imaging station 120b are calibrated in advance such that the axes of the cameras 124a and 124b are lined up with the axes of the stages 128a and 128b, respectively. The transform is then simply a constant offset that can be added to coordinates at which a cell was observed on the first imaging station, to obtain the coordinates where those cells can be found on the second imaging station.

In an example where computer 130 determined matching points for three different reference images, the result can include three pairs of stage coordinates, each in the form (firstX, firstY) and (secondX, secondY). Give these three pairs of coordinates, the transformation to map one set of coordinates to the other can be given by [4]:

$$\text{transform} = \begin{bmatrix} secondX_1 & secondX_2 & secondX_3 \\ secondY_1 & secondY_2 & secondY_3 \\ 1 & 1 & 1 \end{bmatrix} \cdot \begin{bmatrix} firstX_1 & firstX_2 & firstX_3 \\ firstY_1 & firstY_2 & firstY_3 \\ 1 & 1 & 1 \end{bmatrix}^{-1} \quad [4]$$

Given this transformation matrix, a set of coordinates from the first stage 128a can be mapped to a set of coordinates for the second stage 128b by matrix multiplication as can be given by [5]:

$$\begin{bmatrix} secondX \\ secondY \\ 1 \end{bmatrix} = \text{transform} \cdot \begin{bmatrix} firstX \\ firstY \\ 1 \end{bmatrix} \quad [5]$$

Example Process

Figure 1B:
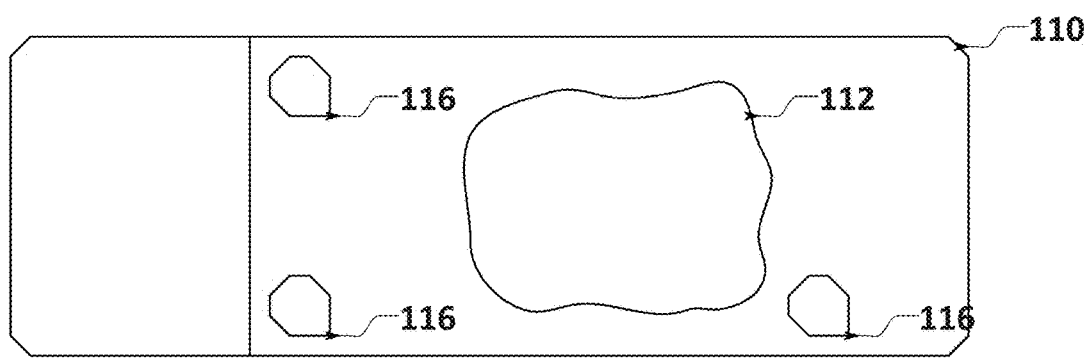
FIG. 1B shows an expanded view of a microscope slide that includes multiple fiducial marks.
Figure 2:
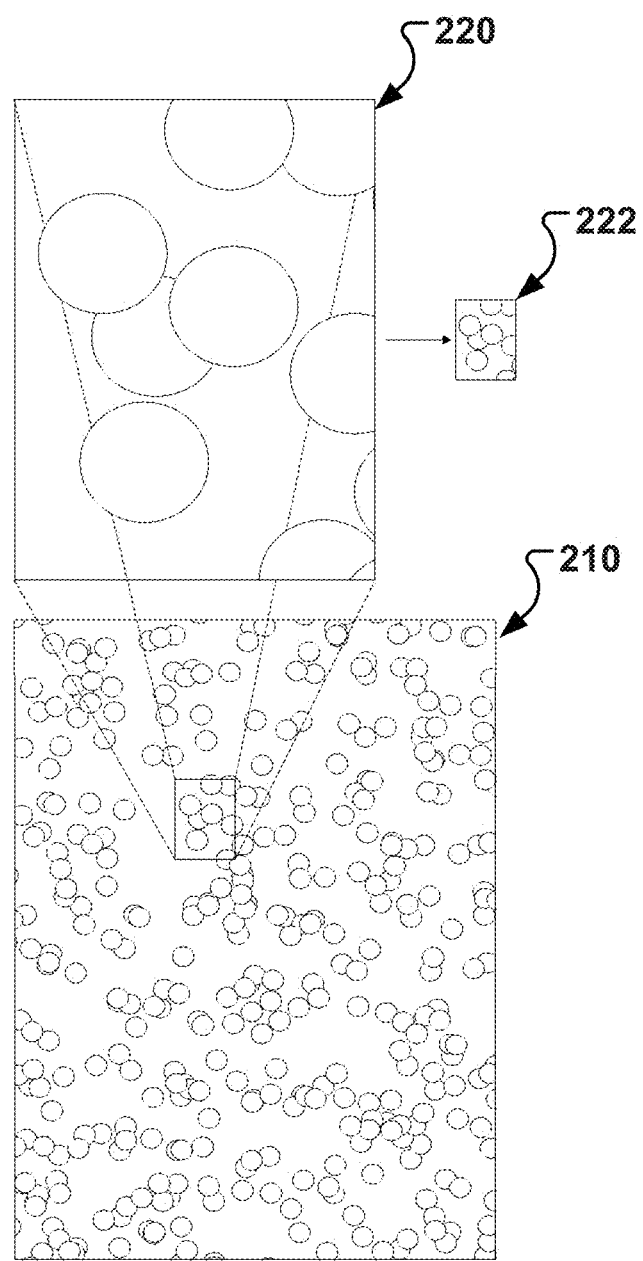
FIG. 2 shows images acquired from the same region of cells by two different imaging stations.
Figure 6:
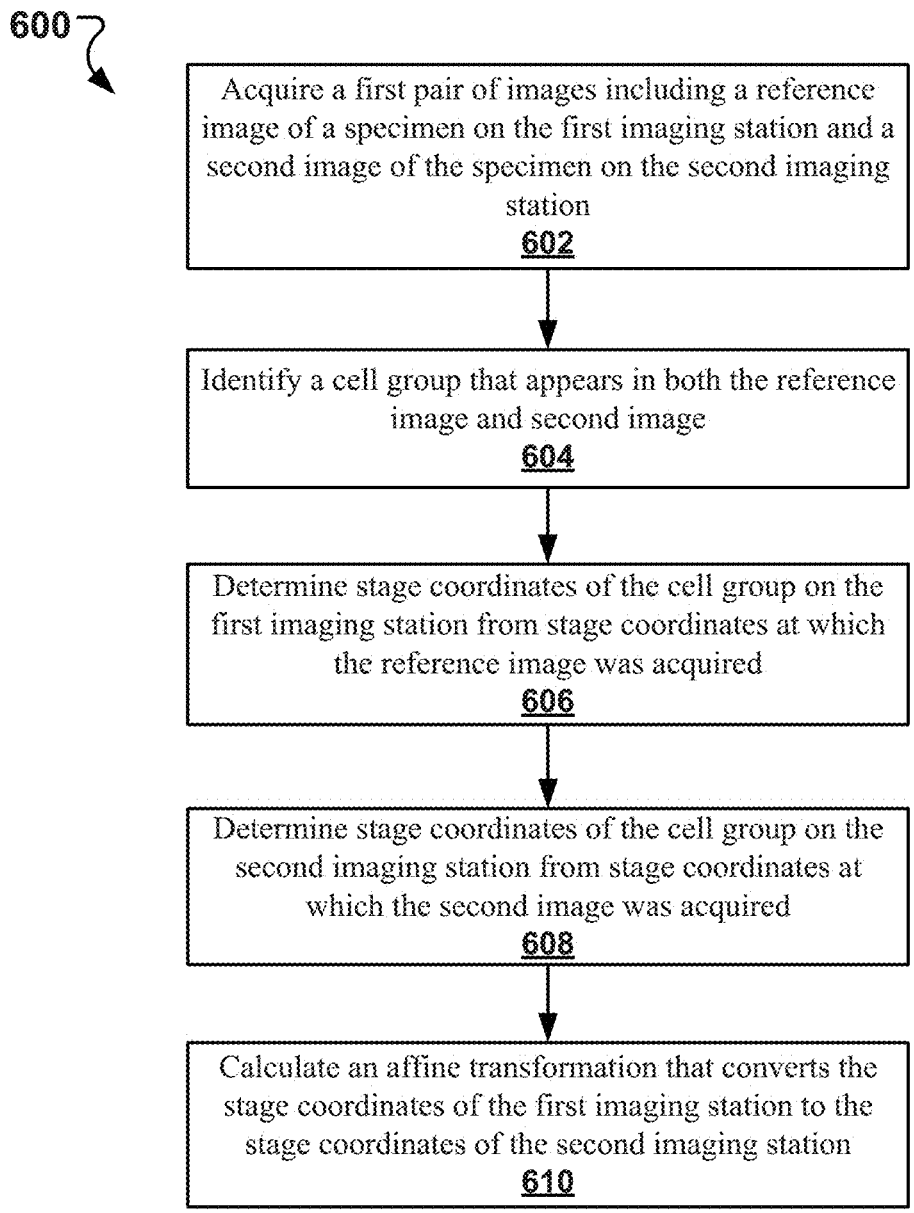
FIG. 6 shows an example of a process for determining a coordination transformation that maps coordinates associated with a first imaging station to coordinates associated with a second imaging station.

FIG. 6 illustrates an example of a process 600 for registering coordinates for cells of interest deposited on a microscope slide and imaged with a first imaging station to coordinates associated with a second imaging station as described for imaging system 100 of FIG. 1. Process 600 can be used for performing image analysis at the first imaging station of a biological specimen 112 deposited on a slide 110 (e.g., low magnification imaging station 120a), and then relocating selected objects on the second imaging station (e.g., high magnification imaging station 120b) using reference images from the first imaging station to translate between the coordinates of a first stage (e.g., first stage 128a of the low magnification imaging station 120a) and a second stage (e.g., second stage 128b of the high magnification imaging station 120b). In this example, specimen 112 comprises a thin monolayer of blood cells deposited on slide 110.

In some implementations, the first imaging station receives a slide 110 containing specimen 112. In some implementations, this can be performed by an automatic slide loading mechanism.

Referring to FIG. 6, at 602, a first pair of images including a reference image of a specimen can be acquired on the first imaging station and a second image of the specimen on the second imaging station. In some implementations, the imaging hardware of the first imaging station 120a scans multiple locations on the slide, and images from one or more locations are saved as reference image candidates. To simplify the numbers in the following discussion, the first imaging station 120a of this example system has a field of view of 1000 μm by 1000 μm, and the pixel size is 1 μm. Further, the scan area of slide 110 containing specimen 112 is 5000 μm by 5000 μm and, the top left corner of the scan area has stage coordinates (50000, 10000) in μm. When the system 100 acquires a first image of specimen 112, the first image is centered at stage position (50500, 10500), so that pixel (0, 0) at the top left corner of the first image corresponds to stage location (50000, 10000) and pixel (999, 999) at the bottom right of the first image corresponds to stage location (50999, 10999).

Computer 130 sends commands to move the first stage 129a to a first location and acquires an in-focus image. Computer 130 then determines the number of red blood cells in the image, while also identifying and locating any white blood cells. In this example, specimen 112 contains white blood cells at image coordinates (200, 800), (500, 400), and (900, 700). These image coordinates can be saved for eventual translation into stage coordinates to revisit at the high-mag imaging station 120b: (50200, 10800), (50500, 10400), and (50900, 10700).

A reference image is selected based on a coverage score of the one or more reference image candidates. As described previously, the coverage of the reference image candidate can be evaluated by, for example, superimposing a grid over the image and counting the number of empty grid squares. In this example, computer 130 determines that three grid squares are empty in the first reference image candidate and therefore, computer 130 assigns a coverage score of three to the reference image candidate. Because no other choice exists yet for the first reference image, the reference image candidate and coverage score are stored, along with the image location (50500, 10500).

Computer 130 repeats the foregoing process for the next location on slide 110 imaged at the first imaging station. If the sample is scanned in a raster pattern, the next stage location can be (51500, 10500). The top left corner of the image can correspond to stage location (51000, 10000), which is directly adjacent to the top right corner of the previous location (50999, 10000). That is, if the two images are laid side by side, the two images form one continuous, larger image of specimen 112. In this way, the system 100 is capable of covering the entire scan area by acquiring multiple images of specimen 112. Image processing and coverage analysis can be repeated for the second reference image candidate. In this example, the second reference image candidate has only two empty grid squares in the coverage test (as compared to three for the first reference image candidate). The second reference image candidate, therefore, displaces the previous reference image candidate for the first reference image, and a new reference image location can be stored at (51500, 10500) with a coverage score of two. In this embodiment, the foregoing process can be repeated for a total of twenty-five scan locations; at the end of this process, the system 100 has identified three reference images, one for each predetermined scan area selected for identifying reference images.

The system 100 transfers the slide 110 onto a second imaging station; for example, by an automatic slide transfer mechanism. In this example, the second imaging station has a field of view of 100 μm by 100 μm with a pixel size of 0.1 μm.

The second imaging station acquires the second image at the same stage coordinates where the first imaging station acquired the reference image. For example, the stage can be moved to the first reference location (51500, 10500). At this location, the system acquires a second image. It then searches the reference image to locate the cells seen at the center of this second image. One or more additional reference locations can be scanned to obtain one or more second images.

At 604, a cell group that appears in both the reference image and the second image can be identified. In some implementations, to identify the cell group, the system 100 creates a set of matching indicators for the second image. For example, the set of matching indicators includes a first matching indicator corresponding to an object center point in the second image, and a second matching indicator corresponding to a background center point in the second image. As previously described, "X" matching indicators can be used to represent various locations within the reference cells in a reference image, and "O" matching indicators can be used to represent a blank region proximate to the reference cells.

The second image can be matched to a location within the reference image. Until a match has been found, the system repeats the foregoing process by acquiring an image and attempting to match the acquired image to a location in the reference image. If the match fails, the system continues the search until a location that matches has been found by, for example, stepping the stage outward from the first location in a spiral pattern.

At 606, the stage coordinates of the cell group on the first imaging station from stage coordinates at which the reference image was acquired can be determined. Similarly, at 608, the stage coordinates of the cell group on the second imaging station from the stage coordinates at which the second image was acquired can be determined. Suppose that the second image acquired by the second imaging station matches the region of the reference image centered on pixel coordinates (900, 300). Since one pixel in the reference image is 1 µm, the stage coordinates (51500, 10500) on the second stage thus corresponds to stage coordinates (51900, 10300) on the first stage.

After determining a match between the second image and a location within the reference image, at 610, a coordinate transformation can be calculated that converts the stage coordinates of the first imaging station to the stage coordinates of the second imaging station. As discussed previously, this can be done by calculating an affine transformation matrix. Using the example given above, the transformation would simply add (−400, 200) to the coordinates of the first stage to obtain the coordinates of the same cells on the second stage.

For the remaining locations identified during the low-mag scan that the system needs to revisit at higher magnification, computer 130 transforms the coordinates of the first imaging station into the coordinate system of the second stage of the second imaging system. For example, the white cells in the first image are located at stage coordinates (50200, 10800), (50500, 10400), and (50900, 10700). These coordinates can be translated into the coordinate system of the second stage: (49800, 11000), (50100, 10600), and (50500, 10900). Computer 130 can then instructing the imaging hardware to move the second stage to each of these coordinates, plus others that were previously added to the list when other images were processed during the low-mag scan. At each location, one or more high-mag images can be acquired and image processing can be performed. For example, the white cells chosen under low magnification can be further imaged and analyzed to determine of the respective types of white cells.

Generic Computer System

Figure 7:
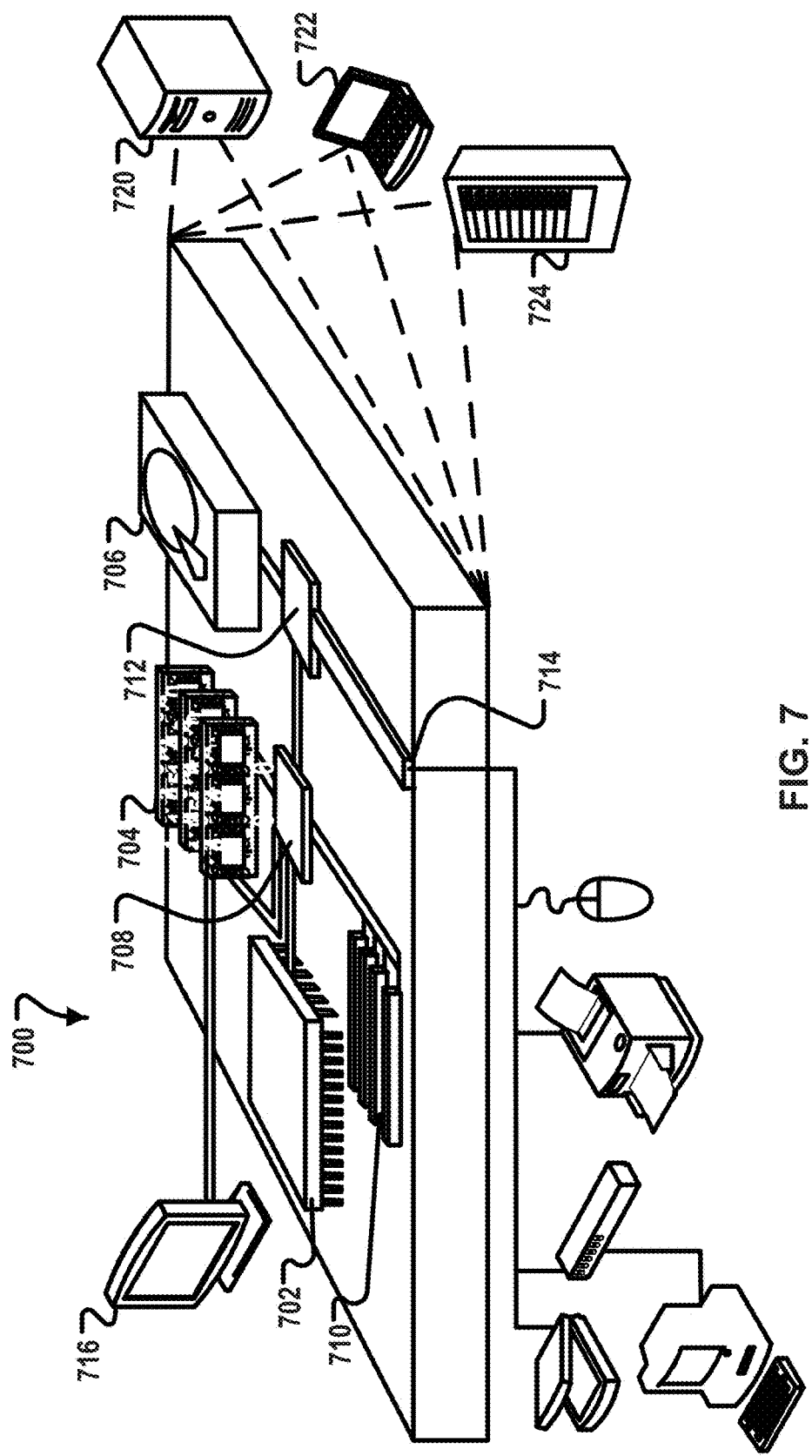
FIG. 7 shows an example of a computing device that can be formed as a part of or in addition to the biological screening system shown in FIG. 1.

FIG. 7 shows an example of a computing device 700 that can be formed as a part of or in addition to the biological screening system 100 to implement the subject matter described here. For example, each of the imaging station 118*a*/118*b*, the server 120 and the reviewing station 122 can include a computing device 700 for executing, for example, various instructions or routines. The computing device 700 can represent various forms of digital computers, such as laptops, desktops, workstations, personal digital assistants, servers, blade servers, mainframes, and other appropriate computers.

As shown in FIG. 7, the computing device 700 can include a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, an entire system can be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product (e.g., non-transitory computer readable medium), apparatus and/or device (e.g., magnetic discs, optical disks, memory, Programmable Logic Devices (PLDs)) used to provide machine instructions and/or data to a programmable processor, including a machine-readable medium (e.g., non-transitory computer readable medium) that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) can be employed by other applications implemented by one or more processors, such as an application executing on one or more servers.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

While this specification contains many specifics, these should not be construed as limitations on the scope of what can be claimed, but rather as descriptions of features that can be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations.

A number of embodiments of the invention have been described. Nevertheless, it will be understood that various modifications can be made without departing from the spirit and scope of the invention. Accordingly, other embodiments are within the scope of the following claims.

What is claimed is:

1. A method for relocating an object of interest at a second imaging station based on coordinates for the object of interest at a first imaging station, the method comprising:

acquiring a first pair of images including a reference image of a biological specimen on the first imaging station and a second image of the biological specimen on the second imaging station, the biological specimen including cellular content deposited on a slide, and the reference image being selected from a plurality of reference image candidates based on a suitability score assigned to the reference image candidates, wherein the suitability score of each reference image candidate is indicative of an amount of the cellular content in the corresponding reference image candidate;

identifying a first cell group that appears in both the reference image and second image;

determining stage coordinates of the first cell group on the first imaging station from stage coordinates at which the reference image was acquired;

determining stage coordinates of the first cell group on the second imaging station from stage coordinates at which the second image was acquired;

calculating an affine transformation that converts the stage coordinates of the first imaging station to the stage coordinates of the second imaging station;

acquiring at least a second pair of images including a second reference image acquired at the first imaging station and a third image acquired at the second imaging station;

for the at least second pair of images, identifying a second cell group that appears in both the reference image and the third image;

determining the stage coordinates of the second cell group associated with the at least second pair of images on the first imaging station and the second imaging station; and calculating the affine transformation based on the first and the at least second pairs of images.

2. The method of claim 1, wherein assigning the suitability score includes assigning a score that corresponds to a probability that an image of a predetermined size taken from within the reference image includes uniquely identifiable cells.

3. The method of claim 1, further comprising acquiring, at the first imaging station, the plurality of reference image candidates from each of a plurality of predetermined regions within a scan area of the specimen obtained during the scan.

4. The method of claim 3, wherein identifying the plurality of predetermined regions comprises:

dividing the scan area of the specimen into equal wedge segments; and removing a central portion of the scan area from each wedge segment.

5. The method of claim 1, further comprising acquiring one or more additional images at the second imaging station at locations near the location corresponding to second image.

6. The method of claim 5, wherein one or more additional images are acquired responsive to a determination that the second image does not include a representation of the first cell group identified in the reference image.

7. The method of claim 1, further comprising:

acquiring a third pair of images including a third reference image acquired at the first imaging station and a fourth image acquired at the second imaging station;

for the third pair of images, identifying a third cell group that appears in both the third reference image and the fourth image;

determining the stage coordinates of the third cell group associated with the third pair of images on the first imaging station and the second imaging station; and calculating the affine transformation based on the first, the second, and the third pairs of images.

8. The method of claim 1, wherein the second cell group is different, at least in part, from the first cell group.

9. A system comprising:

a data processing apparatus; and a memory in data communication with the data processing apparatus and storing instructions executable by the data processing apparatus and upon such execution cause the data processing apparatus to perform operations comprising:

acquiring a first pair of images including a reference image of a biological specimen at a first imaging station and a second image of the biological specimen at a second imaging station, the biological specimen including cellular content deposited on a slide, and the reference image being selected from a plurality of reference image candidates based on a suitability score assigned to the reference image candidates, wherein the suitability score of each reference image candidate is indicative of an amount of the cellular content in the corresponding reference image candidate;

identifying a first cell group that appears in both the reference image and second image;

determining stage coordinates of the first cell group on the first imaging station from stage coordinates at which the reference image was acquired;

determining stage coordinates of the first cell group on the second imaging station from stage coordinates at which the second image was acquired;

calculating an affine transformation that converts the stage coordinates of the first imaging station to the stage coordinates of the second imaging station;

acquiring at least a second pair of images including a second reference image acquired at the first imaging station and a third image acquired at the second imaging station;

for the at least second pair of images, identifying a second cell group that appears in both the second reference image and the third image;

determining the stage coordinates of the second cell group associated with the at least second pair of images on the first imaging station and the second imaging station; and calculating the affine transformation based on the first and the at least second pairs of images.

10. The system of claim 9, wherein the suitability score includes a score that corresponds to a probability that an image of a predetermined size taken from within the reference image includes uniquely identifiable cells.

11. The system of claim 9, wherein the memory further includes instructions executable by the data processing apparatus and upon such execution cause the data processing apparatus to perform operations comprising:

acquiring, at the first imaging station, the plurality of reference image candidates from each of a plurality of predetermined regions within a scan area of the specimen obtained during the scan.

12. The system of claim 11, wherein the memory further includes instructions executable by the data processing apparatus and upon such execution cause the data processing apparatus to perform operations comprising:
  identifying the plurality of predetermined regions including:
    dividing the scan area of the specimen into equal wedge segments; and
    removing a central portion of the scan area from each wedge segment.

13. The system of claim 9, wherein the memory further includes instructions executable by the data processing apparatus and upon such execution cause the data processing apparatus to perform operations comprising:
  acquiring one or more additional images at the second imaging station at locations near the location corresponding to the second image.

14. The system of claim 13, wherein one or more additional images are acquired responsive to a determination that the second image does not include a representation of the first cell group identified in the reference image.

15. The system of claim 9, wherein the memory further includes instructions executable by the data processing apparatus and upon such execution cause the data processing apparatus to perform operations comprising:
  identifying an arrangement of deep background points from the second image; and
  comparing the arrangement of deep background points from the second image to an arrangement of deep background points in the reference image.

16. The system of claim 9, wherein the memory further includes instructions executable by the data processing apparatus and upon such execution cause the data processing apparatus to perform operations comprising:
  acquiring a third pair of images including a third reference image acquired at the first imaging station and a fourth image acquired at the second imaging station;
  for the third pair of images, identifying a third cell group that appears in both the third reference image and the fourth image;
  determining the stage coordinates of the third cell group associated with the third pair of images on the first imaging station and the second imaging station; and
  calculating the affine transformation based on the first, the second, and the third pairs of images.

17. The system of claim 9, wherein the second cell group is different, at least in part, from the first cell group.

18. A non-transitory computer-readable medium having instructions stored thereon, which, when executed by one or more processors, causes the one or more processors to perform operations comprising:
  acquiring a first pair of images including a reference image of a biological specimen at a first imaging station and a second image of the biological specimen at a second imaging station, the biological specimen including cellular content deposited on a slide, and the reference image being selected from a plurality of reference image candidates based on a suitability score assigned to the reference image candidates, wherein the suitability score of each reference image candidate is indicative of an amount of the cellular content in the corresponding reference image candidate;
  identifying a first cell group that appears in both the reference image and second image; determining stage coordinates of the first cell group on the first imaging station from stage coordinates at which the reference image was acquired;
  determining stage coordinates of the first cell group on the second imaging station from stage coordinates at which the second image was acquired;
  calculating an affine transformation that converts the stage coordinates of the first imaging station to the stage coordinates of the second imaging station;
  acquiring at least a second pair of images including a second reference image acquired at the first imaging station and a third image acquired at the second imaging station;
  for the at least second pair of images, identifying a second cell group that appears in both the second reference image and the third image;
  determining the stage coordinates of the second cell group associated with the at least second pair of images on the first imaging station and the second imaging station; and
  calculating the affine transformation based on the first and the at least second pairs of images.

19. The computer-readable medium of claim 18, wherein assigning the suitability score includes assigning a score that corresponds to a probability that an image of a predetermined size taken from within the reference image includes uniquely identifiable cells.

20. The computer-readable medium of claim 18, further comprising instructions for acquiring, at the first imaging station, the plurality of reference image candidates from each of a plurality of predetermined regions within a scan area of the specimen obtained during the scan.

21. The computer-readable medium of claim 20, further comprising instructions for identifying the plurality of predetermined regions, wherein identifying the plurality of predetermined regions comprises:
  dividing the scan area of the specimen into equal wedge segments; and
  removing a central portion of the scan area from each wedge segment.

22. The computer-readable medium of claim 18, further comprising instructions for:
  acquiring a third pair of images including a third reference image acquired at the first imaging station and a fourth image acquired at the second imaging station;
  for the third pair of images, identifying a third cell group that appears in both the third reference image and the fourth image;
  determining the stage coordinates of the third cell group associated with the third pair of images on the first imaging station and the second imaging station; and
  calculating the affine transformation based on the first, the second, and the third pairs of images.

23. The computer-readable medium of claim 18, wherein the second cell group is different, at least in part, from the first cell group.

* * * * *